(12) United States Patent
Natori (10) Patent No.: US 7,048,566 B2
(45) Date of Patent: May 23, 2006

(54) CARD CONNECTOR IN WHICH A LOCKING MEMBER FOR LOCKING A COVER MEMBER IS USED FOR GROUND CONNECTION

(75) Inventor: Akira Natori, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/100,251

(22) Filed: Apr. 6, 2005

(65) Prior Publication Data
US 2005/0221651 A1 Oct. 6, 2005

(30) Foreign Application Priority Data
Apr. 6, 2004 (JP) .............................. 2004-112528

(51) Int. Cl.
H01R 13/62 (2006.01)
(52) U.S. Cl. ...................... 439/326; 439/630; 439/607
(58) Field of Classification Search ................ 439/326, 439/638, 607–610, 928.1, 59–62, 188, 83, 439/327, 357, 940, 331, 76.1, 341–342, 629–630
See application file for complete search history.

(56) References Cited

U.S. PATENT DOCUMENTS

| 5,320,552 | A | 6/1994 | Reichardt et al. |
| 5,718,609 | A | 2/1998 | Braun et al. |
| 6,210,193 | B1 * | 4/2001 | Ito et al. ...................... 439/326 |
| 6,220,882 | B1 * | 4/2001 | Simmel et al. ............. 439/326 |
| 6,234,810 | B1 * | 5/2001 | Schnell et al. ............. 439/76.1 |
| 6,890,203 | B1 * | 5/2005 | Matsunaga et al. ......... 439/331 |
| 2003/0022537 | A1 | 1/2003 | Bricaud et al. |
| 2004/0058576 | A1 | 3/2004 | Pellizari |

FOREIGN PATENT DOCUMENTS

EP 1 400 914 3/2004

OTHER PUBLICATIONS

European Search Report.

* cited by examiner

Primary Examiner—P. Austin Bradley
Assistant Examiner—Edwin A. Leon
(74) Attorney, Agent, or Firm—Collard & Roe, P.C.

(57) ABSTRACT

In a card connector for connecting a card to a connection object, a cover member is faced to a base member to press the card towards a conductive contact. The cover member is slidable along the base member in first and second directions. The base member has a locking member and an elastic member. The locking member has a locking portion to be engaged with the cover member to inhibit movement of the cover member in the second direction when the cover member slides in the first direction. The locking member further has a first terminal portion to be connected to the connection object. The elastic member has a press-contact portion to be contacted with the cover member and a second terminal portion to be connected to the connection object.

13 Claims, 7 Drawing Sheets

CARD CONNECTOR IN WHICH A LOCKING MEMBER FOR LOCKING A COVER MEMBER IS USED FOR GROUND CONNECTION

This application claims priority to prior Japanese patent application JP 2004-112528, the disclosure of which is incorporated herein by reference.

BACKGROUND OF THE INVENTION

This invention relates to a card connector for use in connecting a card to a connection object.

Heretofore, various types of card connectors have been proposed. One of the card connectors is disclosed in U.S. Pat. No. 5,320,552 and has a structure in which a card is locked by a cover member. However, in a state where the card is inserted, the cover member is not sufficiently locked. Accordingly, depending upon a magnitude or a direction of a mechanical shock, the cover may possibly be opened. In this event, connection of the card may not be maintained.

Another card connector is disclosed in U.S. Pat. No. 5,718,609 and has a structure in which terminals are connected to each other by a spring member arranged at a cover rail portion. In this case, however, ground connection in a circuit is obtained at a single point. With this structure, a shielding effect is low and EMI protection is insufficient.

SUMMARY OF THE INVENTION

It is therefore an object of this invention to provide a card connector which is capable of preventing a cover member from being accidentally opened.

It is another object of this invention to provide a card connector which has an enhanced shielding effect by increasing the number of ground connection points between a cover member and a connection object.

It is still another object of this invention to provide a card connector which is capable of easily providing EMI protection.

Other objects of the present invention will become clear as the description proceeds.

According to an aspect of the present invention, there is provided a card connector for connecting a card to a connection object, the connector comprising a base member, a conductive contact held by the base member, and a cover member faced to the base member and adapted to press the card towards the contact, the cover member being slidable along the base member in first and second directions opposite to each other, the base member having a locking member for locking the cover member when the cover member slides in the first direction and an elastic member for urging the cover member in a direction away from the base member, the locking member having a locking portion to be engaged with the cover member to inhibit movement of the cover member in the second direction when the cover member slides in the first direction, and a first terminal portion to be connected to the connection object, the elastic member having a press-contact portion to be contacted with the cover member and a second terminal portion to be connected to the connection object.

BACKGROUND OF THE INVENTION

DESCRIPTION OF THE PREFERRED EMBODIMENT

Referring to FIGS. 1 to 14, description will be made of a card connector according to an embodiment of this invention.

The card connector illustrated in the figures comprises a plurality of conductive contacts 11 and 12, an insulating base member of a generally flat shape, i.e., a base insulator 13 holding the contacts 11 and 12, and a cover member 25 for pressing a card 21 towards the contacts 11 and 12 to bring the card 21 into contact with the contacts 11 and 12. As the card 21, a chip card, an IC card, an SIM card, or the like may be used.

Each of the contacts 11 has an extending end extending from the base insulator 13 in a first direction A1. Each of the contacts 12 has an extending end extending from the base insulator 13 in a second direction A2 opposite to the first direction A1. The extending ends of the contacts 11 and 12 are faced to each other in the first and the second directions A1 and A2. The contacts 11 are arranged along the base insulator 13 and spaced from one another in a third direction A3 perpendicular to the first direction A1. Likewise, the contacts 12 are arranged along the base insulator 13 and spaced from one another in the third direction A3. Each of the contacts 11 has a contacting portion 11a protruding above one surface or an upper surface of the base insulator 13 and a terminal portion 11b extending on the downside of the base insulator 13. Likewise, each of the contacts 12 has a contacting portion 12a protruding above the upper surface of the base insulator 13 and a terminal portion 12b extending on the downside of the base insulator 13. The contacting portions 11a and 12a are brought into contact with a plurality of contacting portions 21a of the card 21 when the card 21 is placed on the base insulator 13.

On the upside of the base insulator 13, a cover member 25 formed by a conductive plate is provided. As shown in FIGS. 9 through 14, the cover member 25 has a pair of shaft portions 25d integrally formed, a pair of rail portions 25m and 25n for guiding the card 21 to be inserted, and a pair of flange-like locked portions 25a each of which is formed at a part of each of the rail portions 25m and 25n and protrudes outside the cover member 25 in the third direction A3 to be locked and fixed to the base insulator 13. Each of the locked portions 25a has a lock hole 25g. Each of the locked portions 25a may protrude inside the cover member 25 in the third direction.

The cover member 25 has one end portion and the other end portion in the first and the second directions A1 and A2, respectively. In the following, the one end portion and the other end portion will be referred to as first and second end portions, respectively, for simplicity of description. The cover member 25 is held by a bearing structure (which will later be described) to be rotatable and slidable with respect to the base insulator 13. Specifically, the second end portion of the cover member 25 is held by the bearing structure so that the cover member 25 is rotatable around a center axis extending in the third direction A3 and slidable in the first and the second directions A1 and A2.

The base insulator 13 has a pair of locking members 31 made of a metal material and an elastic member 37 comprising a long flat spring having conductivity and elasticity. The locking members 31 and the elastic member 37 are disposed on lateral sides in the third direction A3 so as not to interfere with the card 21 to be mounted. The base insulator 13 is further provided with a pair of card guide portions 13e and 13f for guiding the card 21 to be mounted. The card guide portions 13e and 13f are formed at both end portions in the first and the second directions A1 and A2, respectively.

Each of the locking members 31 has a claw-like locking portion 31a and a first terminal portion 31b having a shape suitable for soldering. The locking portion 31a is for engaging with the lock hole 25g of the cover member 25 so that the cover member 25 is locked in the second direction A2 and in an opening direction (depicted by an arrow II in FIG. 3). The first terminal portion 31b is for being connected by soldering to a connection object 50 such as a printed circuit board.

The elastic member 37 has a press-contact portion 37a in the form of a leaf spring, a second terminal portion 37b having a shape suitable for soldering, and a first connecting portion 37c which will later be described. The press-contact portion 37a is elastically contacted with the cover member 25 in the vicinity of the second end portion to urge the cover member 25 in the opening direction when the cover member 25 is in a closed state. The second terminal portion 37b is a part to be connected by soldering to the connection object 50.

Figure 1:
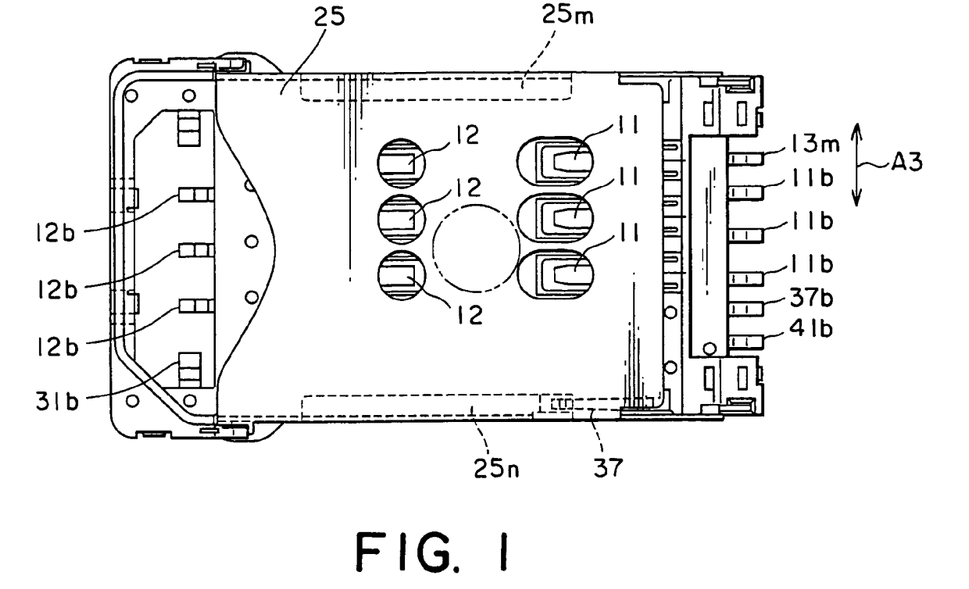
FIG. 1 is a plan view of a card connector according to an embodiment of this invention.
Figure 2:
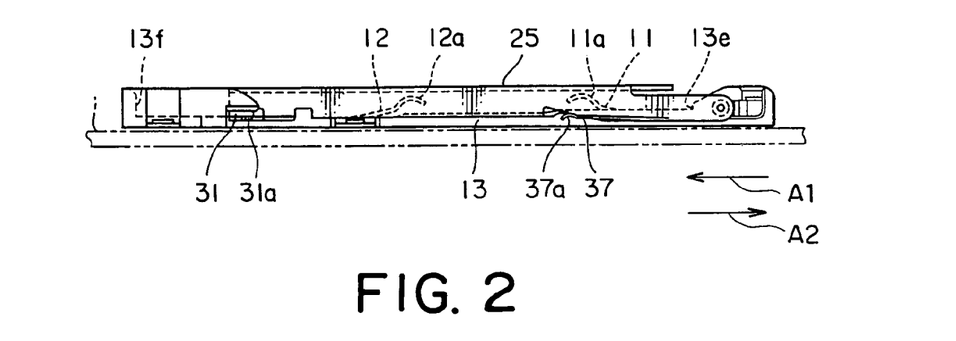
FIG. 2 is a front view of the card connector illustrated in FIG. 1.
Figure 3:
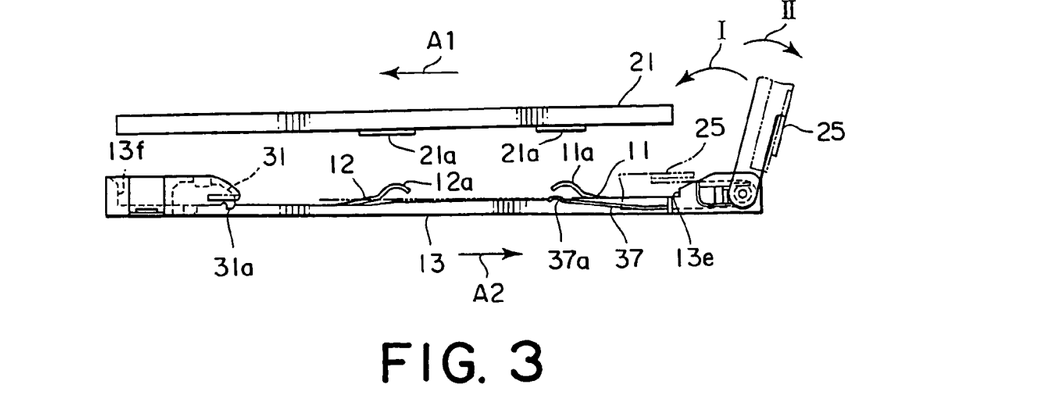
FIG. 3 is a front view showing the card connector illustrated in FIG. 1 together with a card, for describing rotation of a cover member.
Figure 4:
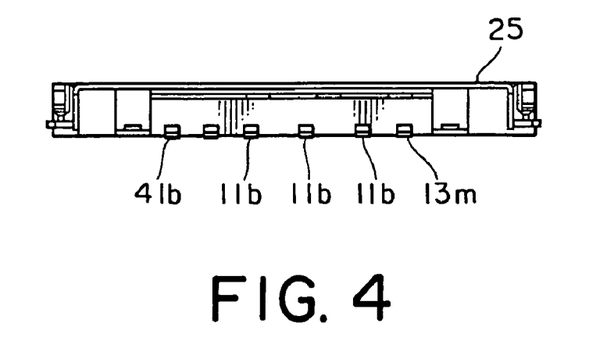
FIG. 4 is a right side view of the card connector illustrated in FIG. 1.
Figure 5:
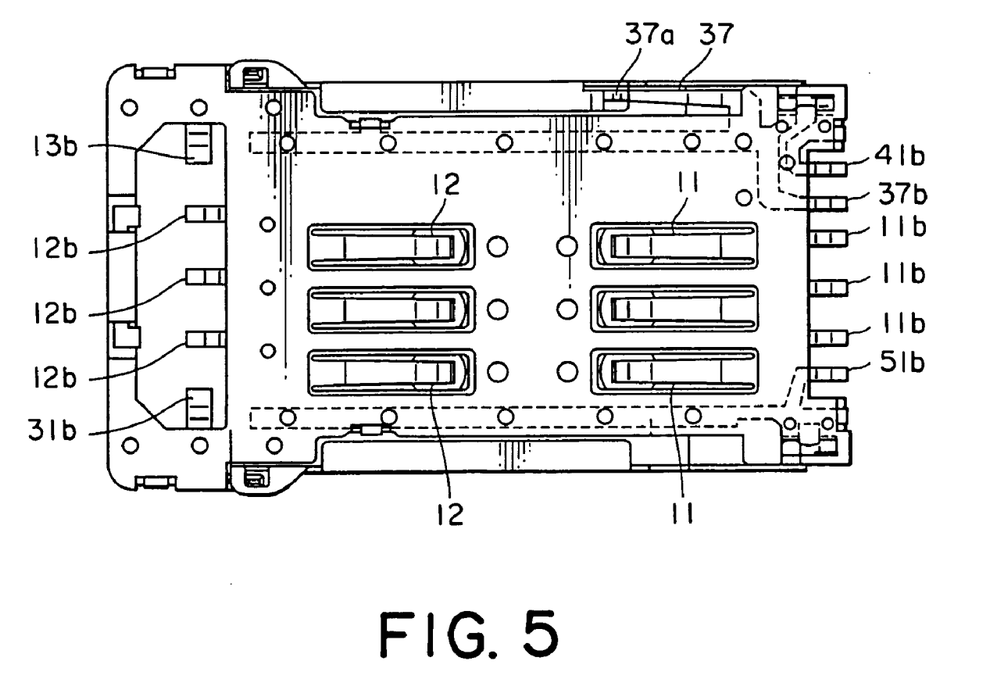
FIG. 5 is a bottom view of the card connector illustrated in FIG. 1.
Figure 6:
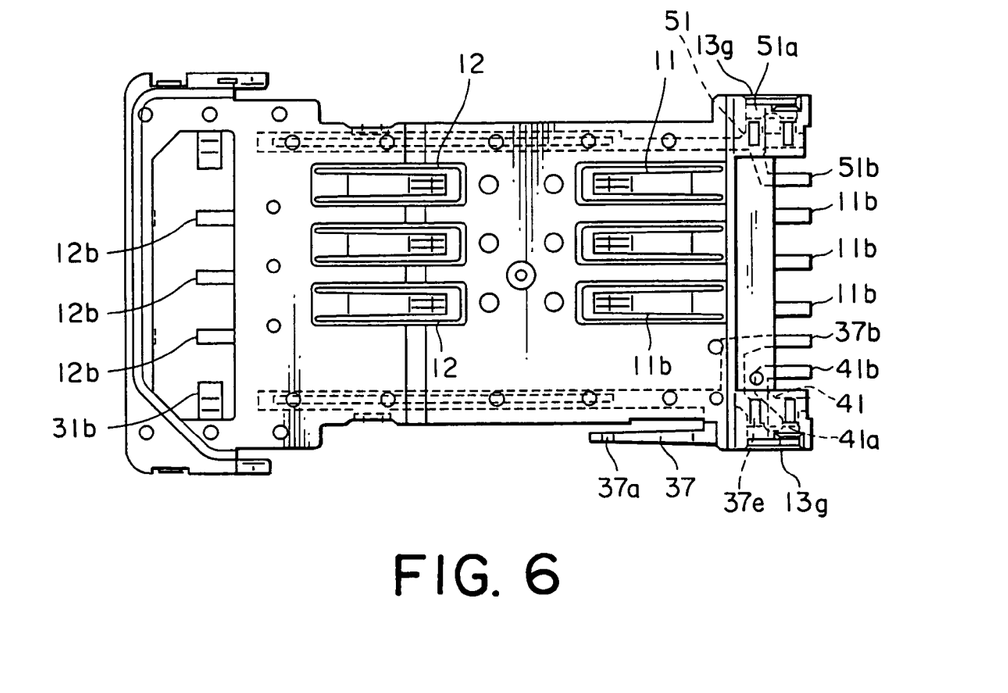
FIG. 6 is a plan view of the card connector illustrated in FIG. 1 in a state where the cover member is removed.
Figure 7:
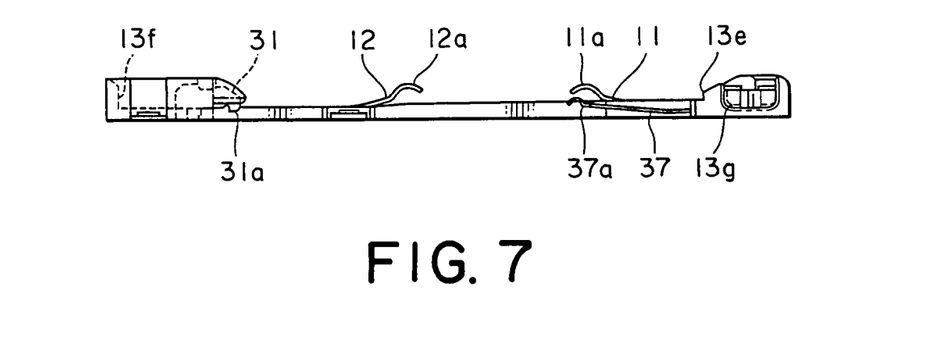
FIG. 7 is a front view of the card connector in the state in FIG. 6.
Figure 8:
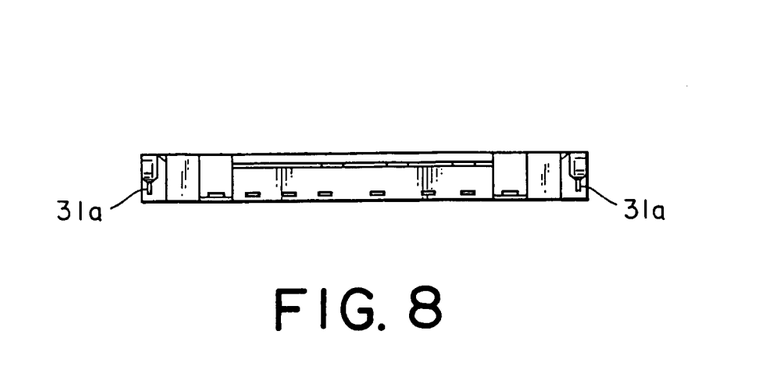
FIG. 8 is a right side view of the card connector in the state in FIG. 6.
Figure 9:
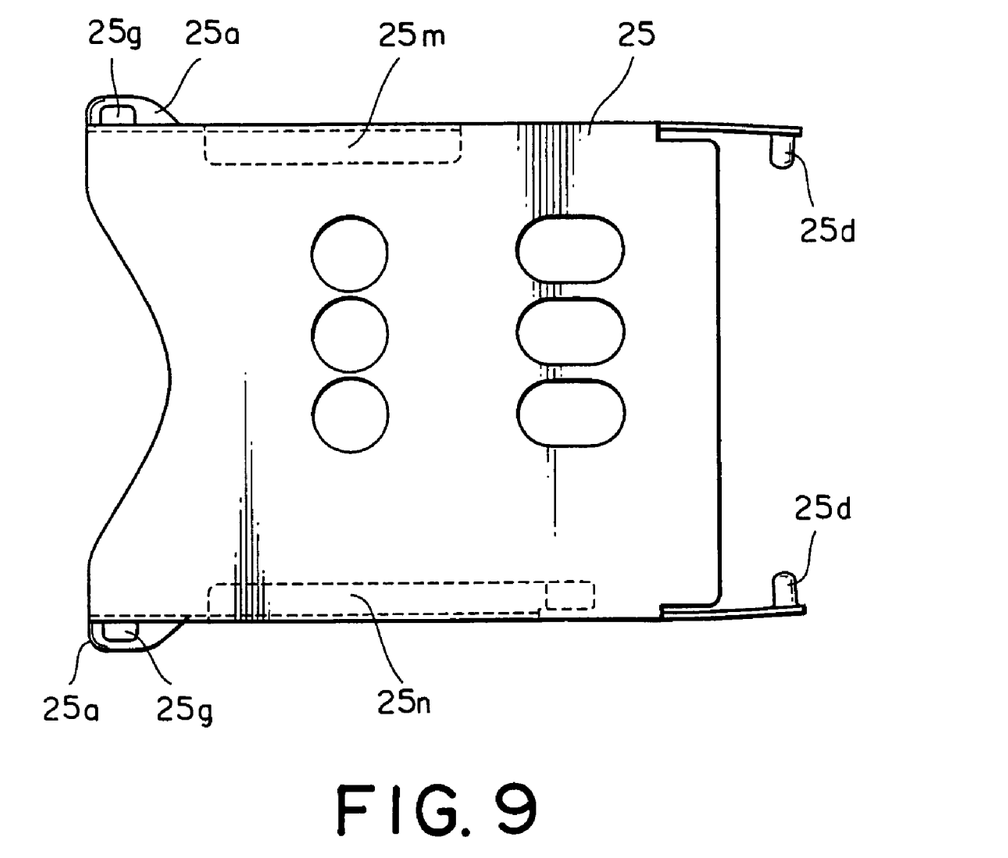
FIG. 9 is a plan view of the cover member of the card connector in FIG. 1.
Figure 10:
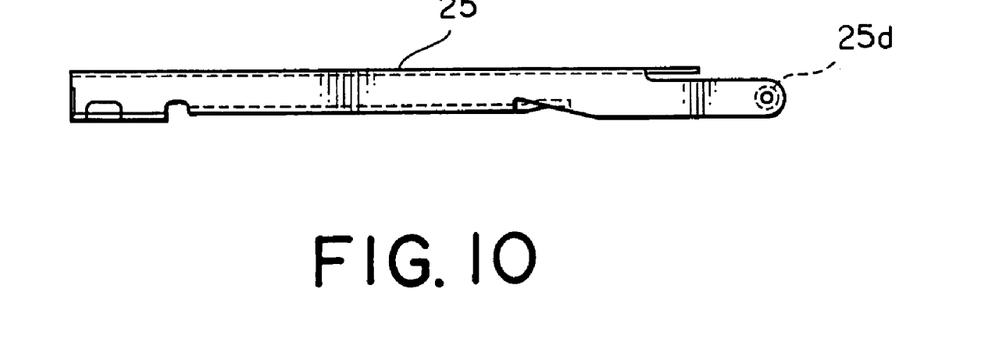
FIG. 10 is a front view of the cover member illustrated in FIG. 9.
Figure 11:
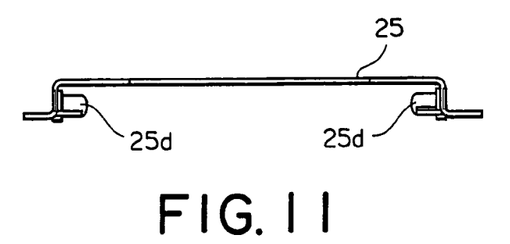
FIG. 11 is a right side view of the cover member illustrated in FIG. 9.
Figure 12:
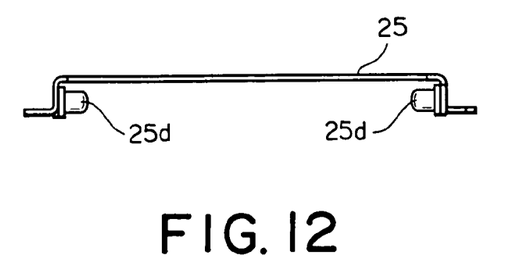
FIG. 12 is a left side view of the cover member illustrated in FIG. 9.
Figure 13:
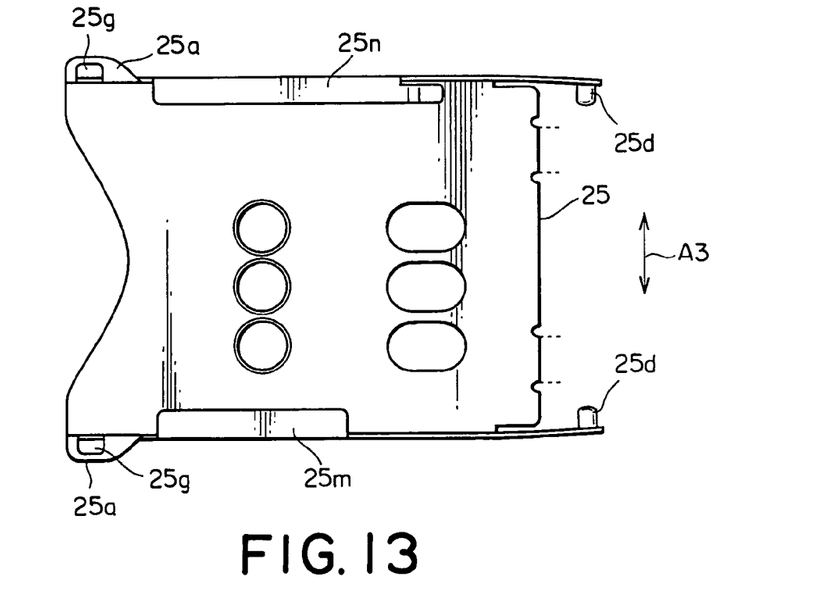
FIG. 13 is a rear view of the cover member illustrated in FIG. 9.
Figure 14:
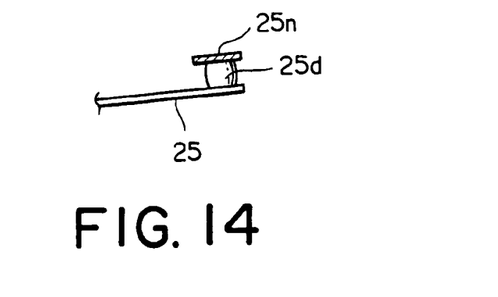
FIG. 14 is a view showing a part of the cover member illustrated in FIG. 9.

The cover member 25 is rotated in a closing direction (depicted by an arrow I in FIG. 3) so as to sandwich the card 21 on the base insulator 13. Thereafter, the cover member 25 is made to slide in the first direction (see FIG. 3). Then, the cover member 25 is engaged with the locking members 31 to be locked in the closed state. In this case, the lock holes 25g of the cover member 25 and the locking portions 31a of the locking members 31 are engaged with each other to be locked. This state (locked state) is illustrated in FIGS. 1 and 2.

Thus, the cover member 25 is locked by the locking members 31 to be inhibited from movement in the second direction A2. Therefore, even if an apparatus equipped with the connector is subjected to heavy mechanical shock due to fall or the like, the cover member 25 is prevented from being accidentally opened.

When the cover member 25 is pressed against the base insulator 13, the cover member 25 is unlocked. Thereafter, the cover member 25 is made to slide in the second direction A2. Then, the cover member 25 is openable.

Figure 15:
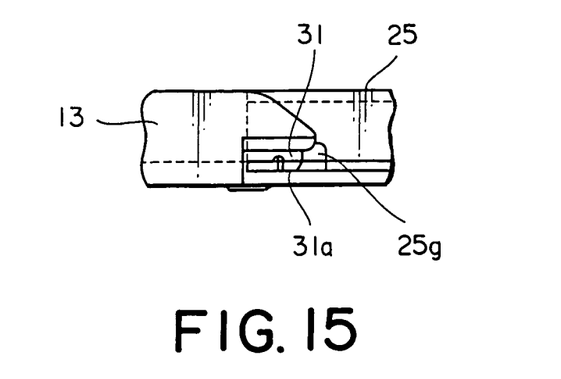
FIG. 15 is a view showing a characteristic part of FIG. 2.
Figure 16:
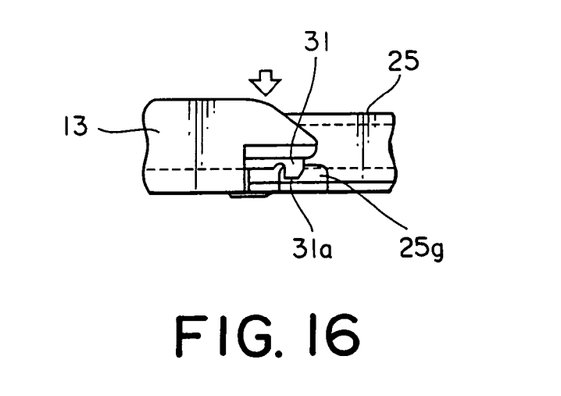
FIG. 16 is a view similar to FIG. 15 in the middle of operation of unlocking the cover member.
Figure 17:
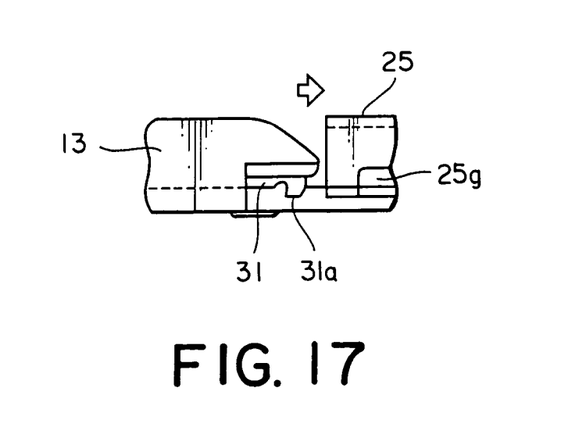
FIG. 17 is a view similar to FIG. 15 after the cover member is unlocked.

Referring to FIGS. 15 to 17 in addition, a process of unlocking the cover member 25 from the locked state illustrated in FIGS. 1 and 2 will be described in detail.

In the locked state in FIG. 15, the lock holes 25g of the locked portions 25a of the cover member 25 are engaged with and locked by the locking portions 31a of the locking members 31. In order to release the cover member 25, the cover member 25 is pressed as illustrated in FIG. 16. Then, the locking portions 31a of the locking members 31 are disengaged from the lock holes 25g of the locked portions 25a of the cover member 25. Thereafter, the cover member 25 is slightly moved in the second direction A2 as illustrated in FIG. 17. As a result, the cover member 25 is released from the locked state.

Figure 18:
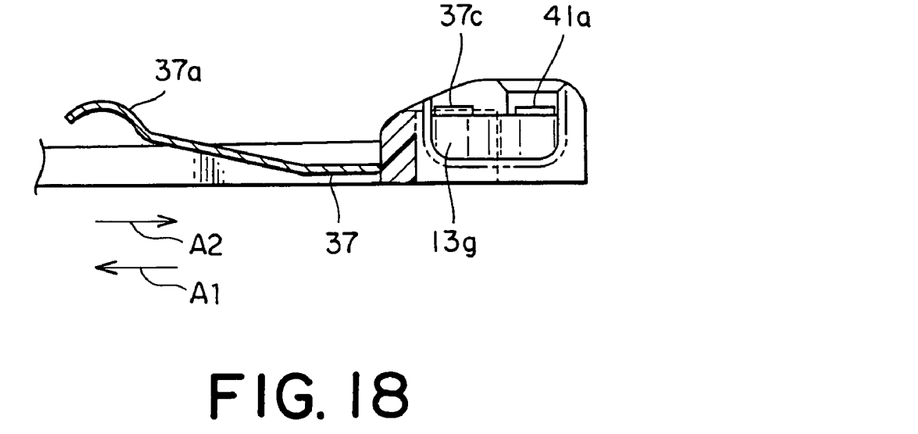
FIG. 18 is an enlarged sectional view of a part of FIG. 7.
Figure 19:
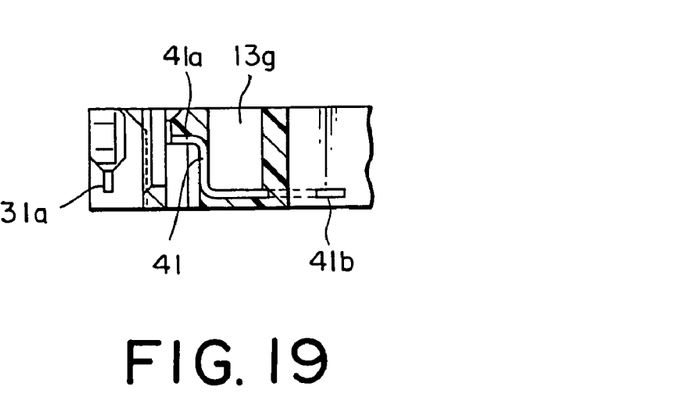
FIG. 19 is an enlarged sectional view of a part of FIG. 8.
Figure 20:
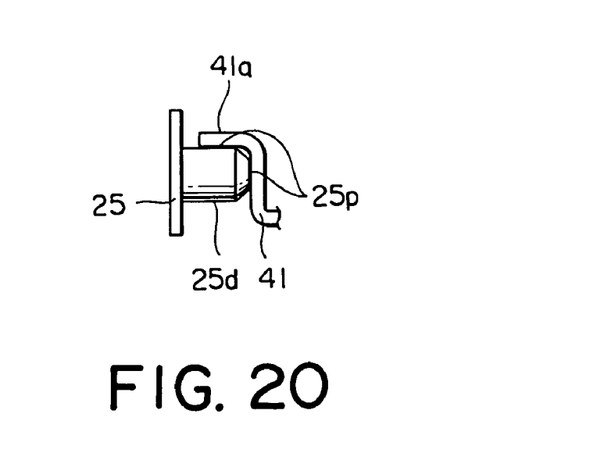
FIG. 20 is an enlarged view of a characteristic part of the card connector in FIG. 1, showing engagement between a metal piece in a bearing portion of a base member and a shaft portion of the cover member.

Referring to FIGS. 18 through 20 in addition, the bearing structure will be described.

At the second end portion of the base insulator 13, a metal piece 41 is arranged. The metal piece 41 has a second connecting portion 41a to be contacted with the cover member 25 and a third terminal portion 41b to be connected by soldering to the connection object 50. The base insulator 13 may be provided with one or more similar metal pieces.

The base insulator 13 has a pair of bearing portions 13g formed at the second end portion and spaced from each other in the third direction A3. At one of the bearing portions 13g (will be called a first bearing portion), the first connecting portion 37c of the elastic member 37 and the second connecting portion 41a of the metal piece 41 are disposed. At the first bearing portion 13g, the first connecting portion 37c and the second connecting portion 41a are positioned towards the first and the second directions A1 and A2, respectively. Thus, by a combination of the base insulator 13, the first connecting portion 37c, and the second connecting portion 41a, the first bearing portion 13g is formed substantially as a long hole extending long in the first and the second directions A1 and A2.

At the other bearing portion 13g (will be called a second bearing portion), a third connecting portion 51a of another metal piece 51 is disposed. By a combination of the base insulator 13 and the third connecting portion 51a, the second bearing portion 13g is also formed substantially as a long hole extending long in the first and the second directions A1 and A2. The third connecting portion 51a is a part to be contacted with the cover member 25. The metal piece 51 further has a fourth terminal portion 51b to be connected by soldering to the connection object 50.

The shaft portions 25d of the cover member 25 are formed at the second end portion and spaced from each other in the third direction A3. The shaft portions 25d of the cover member 25 are inserted into the bearing portions 13g of the base insulator 13, respectively, so that the cover member 25 is held by the base insulator 13.

The metal piece 41 has a generally L-shape or a generally U-shape and has at least two contact point portions 25p contacted with the cover member 25. When the cover member 25 is opened, the cover member 25 is moved in the second direction A2. In this state, the shaft portions 25d of the cover member 25 are brought into contact with the second and the third connecting portions 41a and 51a of the metal pieces 41 and 51, respectively. Therefore, the cover member 25 is electrically connected to the connection object 50 through the third and the fourth terminals 41b and 51b.

When the cover member 25 is locked in the closed state, the cover member 25 is moved in the first direction A1. In this state, the shaft portions 25d of the cover member 25 are contacted with the first connecting portion 37c of the elastic member 37 and the third connecting portion 51a of the metal piece 51. Therefore, the cover member 25 is electrically connected to the connection object 50 through the second and the fourth terminal portions 37b and 51b.

As a result, the locking portions 31a of the locking members 31, the shaft portions 25d of the cover member 25, and the bearing portions 13g of the base insulator 13 cooperate with one another so that ground connection between the cover member 25 and the connection object 50 is obtained via four or more routes. Further, by the above-mentioned ground connection, EMI protection is easily provided.

The metal piece 41 may be used as a switch for detecting a position (a locked position or an unlocked position) of the cover member 25. For example, at the locked position of the cover member 25, the third terminal portion 41b is not connected to the elastic member 37 so that the switch is off. At the unlocked position of the cover member 25, the third terminal portion 41b is connected to the elastic member 37 so that the switch is on.

While the present invention has thus far been described in connection with a preferred embodiment thereof, it will readily be possible for those skilled in the art to put this invention into practice in various other manners.

What is claimed is:

1. A card connector for connecting a card to a connection object, the connector comprising:
   a base member;
   a conductive contact held by the base member; and
   a cover member faced to the base member and adapted to press the card towards the contact, the cover member being slidable along the base member in first and second directions opposite to each other,
   the base member having a locking member for locking the cover member when the cover member slides in the first direction and an elastic member for urging the cover member in a direction away from the base member,
   the locking member having a locking portion to be engaged with the cover member to inhibit movement of the cover member in the second direction when the cover member slides in the first direction, and a first terminal portion to be connected to the connection object,
   the elastic member having a press-contact portion to be contacted with the cover member and a second terminal portion to be connected to the connection object,
   an end portion of the cover member in the second direction being engaged with the base member to be rotatable around a center axis extending along the base member in a direction perpendicular to the first direction, and
   the locking member being engaged with the cover member in the vicinity of an end portion of the cover member in the first direction to lock the cover member with respect to the direction away from the base member.

2. The card connector according to claim 1, wherein the base member is insulative while each of the cover member, the locking member, and the elastic member is conductive.

3. The card connector according to claim 1, wherein the end portion of the cover member in the second direction is slidably guided in the first and the second directions with respect to the base member.

4. The card connector according to claim 1, wherein the locking member is disposed at an end portion of the base member in a direction parallel to the center axis.

5. A card connector for connecting a card to a connection object, the connector comprising:
   a base member;
   a conductive contact held by the base member; and
   a cover member faced to the base member and adapted to press the card towards the contact, the cover member being slidable along the base member in first and second directions opposite to each other,
   the base member having a locking member for locking the cover member when the cover member slides in the first direction and an elastic member for urging the cover member in a direction away from the base member,
   the locking member having a locking portion to be engaged with the cover member to inhibit movement of the cover member in the second direction when the cover member slides in the first direction, and a first terminal portion to be connected to the connection object,
   the elastic member having a press-contact portion to be contacted with the cover member and a second terminal portion to be connected to the connection object,
   an end portion of the cover member in the second direction being engaged with the base member to be rotatable around a center axis extending along the base member in a direction perpendicular to the first direction, and
   the elastic member elastically pressing the cover member in the vicinity of the end portion in the second direction to urge the cover member in the direction away from the base member.

6. The card connector according to claim 5 wherein the elastic member is disposed at an end portion of the base member in a direction parallel to the center axis.

7. The card connector according to claim 5, wherein the base member is insulative while each of the cover member, the locking member, and the elastic member is conductive.

8. The card connector according to claim 5, wherein the end portion of the cover member in the second direction is slidably guided in the first and the second directions with respect to the base member.

9. A card connector for connecting a card to a connection object, the connector comprising:
   a base member;
   a conductive contact held by the base member; and
   a cover member faced to the base member and adapted to press the card towards the contact, the cover member being slidable along the base member in first and second directions opposite to each other,
   the base member having a locking member for locking the cover member when the cover member slides in the first direction and an elastic member for urging the cover member in a direction away from the base member, the locking member having a locking portion to be engaged with the cover member to inhibit movement of the cover member in the second direction when the cover member slides in the first direction, and a first terminal portion to be connected to the connection object, the elastic member having a press-contact portion to be contacted with the cover member and a second terminal portion to be connected to the connection object, an end portion of the cover member in the second direction being engaged with the base member to be rotatable around a center axis extending along the base member in a direction perpendicular to the first direction, the cover member having a pair of shaft portions on the center axis, the base member having a pair of bearing portions supporting the shaft portions, respectively, and the elastic member having a first connecting portion to be connected to one of the shaft portions when the cover member is locked.

10. The card connector according to claim 9, wherein the base member is insulative while each of the cover member, the locking member, and the elastic member is conductive.

11. The card connector according to claim 9, wherein the end portion of the cover member in the second direction is slidably guided in the first and the second directions with respect to the base member.

12. The card connector according to claim 9, further comprising:
   a second connecting portion disposed at one of the bearing portions to be connected to the one of the shaft portions when the cover member is away from the base member; and
   a third terminal portion connected to the second connecting portion to be connected to the connection object.

13. The card connector according to claim 12, further comprising:
   a third connecting portion disposed at the other bearing portion to be connected to the other shaft portion; and
   a fourth terminal portion connected to the third connecting portion to be connected to the connection object.

* * * * *